United States Patent [19]

Arakawa et al.

[11] Patent Number: 4,876,078

[45] Date of Patent: Oct. 24, 1989

[54] PROCESS FOR PREPARING CARBON FIBERS IN GAS PHASE GROWTH

[75] Inventors: Kohei Arakawa; Takashi Ohsaki, both of Shibuya, Japan

[73] Assignee: Nikkiso Co., Ltd., Tokyo, Japan

[21] Appl. No.: 70,648

[22] Filed: Jul. 6, 1987

Related U.S. Application Data

[63] Continuation of Ser. No. 719,340, Apr. 3, 1985, abandoned.

[30] Foreign Application Priority Data

Apr. 20, 1984 [JP] Japan ................................. 59-78662

[51] Int. Cl.$^4$ ............................................... D01F 9/12
[52] U.S. Cl. ................................. 423/447.3; 423/453; 423/458
[58] Field of Search .................... 423/447.3, 448, 453, 423/458; 502/229

[56] References Cited

U.S. PATENT DOCUMENTS

| | | | |
|---|---|---|---|
| 1,868,921 | 7/1932 | Schmidt et al. | 423/453 |
| 2,796,331 | 6/1957 | Kauffman | 423/447.3 |
| 3,375,308 | 3/1968 | Turkat | 423/447.3 |
| 3,529,988 | 9/1970 | Woerner | 423/458 X |
| 3,664,813 | 5/1972 | Hollander et al. | 423/448 |
| 4,572,813 | 2/1986 | Arakawa | 423/448 |

FOREIGN PATENT DOCUMENTS

| | | | |
|---|---|---|---|
| 12091 | 7/1966 | Japan . | |
| 41038 | 6/1973 | Japan . | |
| 64527 | 5/1975 | Japan . | |
| 33210 | 9/1976 | Japan . | |
| 103528 | 8/1977 | Japan . | |
| 52-107329 | 8/1977 | Japan . | |
| 7538 | 3/1978 | Japan . | |
| 162412 | 12/1980 | Japan . | |
| 56-118913 | 9/1981 | Japan | 423/447.3 |
| 117622 | 7/1982 | Japan . | |
| 180615 | 10/1983 | Japan . | |
| 197314 | 11/1983 | Japan . | |
| 54998 | 3/1985 | Japan . | |
| 54999 | 3/1985 | Japan . | |
| 324959 | 2/1930 | United Kingdom | 423/453 |

OTHER PUBLICATIONS

Schmidt et al., "Filamentous Carbon and Graphite", AFML-TR-65-160, 1965, pp. 16-19.
Comprehensive Inorganic Chemistry, J. C. Bailas, Jr., et al., Pergamon Press, 1973, p. 1000.
Introduction to Advanced Inorganic Chemistry, Philip John Durrant et al., John Wiley & Sons, Inc., 1962, p. 1164.
Schultzenberger, C. R. Acad. Sci., 111, 774-778, (1890).
Iley et al., J. Chem. Soc., 11, 1362-1366, (1948).
Trillat et al., C. R. Acad. Sci., 230, 2203-2205, (1950).
Walker et al., J. Phys. Chem., 63, 140-149, (1959).
Ruston et al., Carbon, 7, 47-57, (1969).
Koyama et al., Applied Physics, 42, 7, 690-696, (1973).
Oberlin et al., J. of Crystal Growth, 32, 335-349, (1976).
Kashu, Chem. Engineering, 46, 10, 530-535, (1982).
Otsuka et al., Chemical Society of Japan, 6, 869-878, (1964).
Endo et al., "Growth Mechanism of Carbon Fibers in a Vapor Phase," Second Annual Conference of Carbon Material Society Proceedings, (paper B6), 1975.
M. Hatano, T. Ohsaki and K. Arakawa, "Graphite Whiskers by New Process and Their Composites", 30th National SAMPE Symposium, Mar. 19-21, 1985.
Baird et al., "Carbon Formation on Iron and Nickel (List continued on next page.)

*Primary Examiner*—John Doll
*Assistant Examiner*—Jeffrey Edwin Russell
*Attorney, Agent, or Firm*—Robert R. Jackson; Douglas J. Gilbert; Leon R. Yankwich

[57] ABSTRACT

An improved process for preparing carbon fibers in a gaseous phase reaction comprising introducing a gas mixture comprising at least one carbon compound, at least one inorganic transition metal compound gas and at least one carrier gas into a reactor and subjecting the mixture to a temperature of 600° C. to 1300° C. in the reactor for inducing growth of carbon fibers.

2 Claims, 1 Drawing Sheet

OTHER PUBLICATIONS

Foils by Hydrocarbon Pyrolysis—Reactions at 700° C.," Carbon, 12, 591–602, (1974).
Baker et al., "Formation of Filamentous Carbon from Iron, Cobalt and Chromium Catalyzed Decomposition of Acetylene," Journal of Catalysis, 30, 86–95, (1973).
Koyama, "Carbon Fibers Produced by Thermal Decomposition of Vaporized Hydrocarbon," J. Fiber Technology, 25, No. 6, 424–430, (1972).
Baker et al., "Nucleation and Growth of Carbon Deposits from the Nickel Catalyzed Decomposition of Acetylene," J. Catalysis, 26, 51–62, (1972).
Fryer et al., "Low Temperature Formation of Fibrous Carbon on Platinum Black," Carbon, 11, 665–666, (1973).

PROCESS FOR PREPARING CARBON FIBERS IN GAS PHASE GROWTH

This is a continuation of application Ser. No. 719,340, filed Apr. 3, 1985, now abandoned.

A process for preparing carbon fibers in gas phase growth is disclosed, in which a mixed gas of a carbon compound gas, a gas of an inorganic transition metal compound and a carrier gas is reacted at a high temperature.

FIELD OF THE INVENTION

This invention relates to a process for preparing carbon fibers in gas phase growth.

BACKGROUND OF THE INVENTION

Carbon fibers produced in gas phase growth are known to have much more excellent mechanical and electrical properties due to excellent crystal orientation than those of conventional carbon fibers, and their commercial production has been desired.

Heretofore, the carbon fibers according to the gas phase growth have been produced by placing in an electric furnace a substrate of alumina or graphite, on a surface of which is distributed an ultra-fine metal particle catalyst of iron, nickel etc., which in turn is reduced by a hydrogen gas, and thereafter decomposing thermally a mixed gas of a hydrocarbon gas (such as benzene) and a carrier gas (such as hydrogen) on the catalyst. However, such procedure has several disadvantages as follows:

(1) high irregularity of fiber length on account of temperature differences with resulting uneven fiber length and ununiform dispersion of catalyst with resulting coarseness and closeness of the fiber formation, (2) since an organic compound gas as a carbon source is consumed by reaction, there occurs a difference in a concentration of the organic compound between an inlet and an outlet to the reactor, so that sizes of the resulting fibers vary in the vicinity of the inlet or the outlet, (3) the carbon fiber is formed only on the surface of the substrate but the central zone of the reactor is not involved in the reaction, resulting in a poor yield, and (4) independent and separate processes, such as dispersion of the ultrafine particles onto the substrate, placement of said substrate within a furnace, reduction of oxidized metal particles with hydrogen at the elevated temperature, formation of carbon fibers on the substrate through thermal decomposition of the organic compound, decrease of the furnace temperature, and removal of the carbon fibers are required, so that continuous production is difficult and thus the productivity is low.

In order to solve the above problems and to improve productivity and quality of the carbon fibers, the inventors have earnestly studied continuous processes for producing carbon fibers in the gas phase growth to develop an improved process in which a mixed gas of a carbon compound gas, an organic transition metal compound gas and a carrier gas is heated at a temperature ranging from 600° C. to 1300° C., and has filed a patent application therefor (Japanese Patent Application No. 162606/83).

Subsequently, the inventor has further continued the studies to find out the inorganic transition metal compounds may be efficiently employed as well, which have relatively high volatility or which are soluble in an organic solvent.

Accordingly, an object of the invention is to provide a process for preparing carbon fibers in gas phase growth, which can solve the problems in the prior art and improve the productivity.

SUMMARY OF THE INVENTION

In order to achieve the above object, the invention provides a process for preparing carbon fibers in gas phase growth, characterized in that a mixed gas of at least one carbon compound gas, at least one inorganic transition metal compound gas and at least one carrier gas is reacted at a high temperature.

The invention will be described in more detail hereinbelow for its preferred embodiments with reference to the accompanying drawings.

PREFERRED EMBODIMENTS OF THE INVENTION

Figure 1:
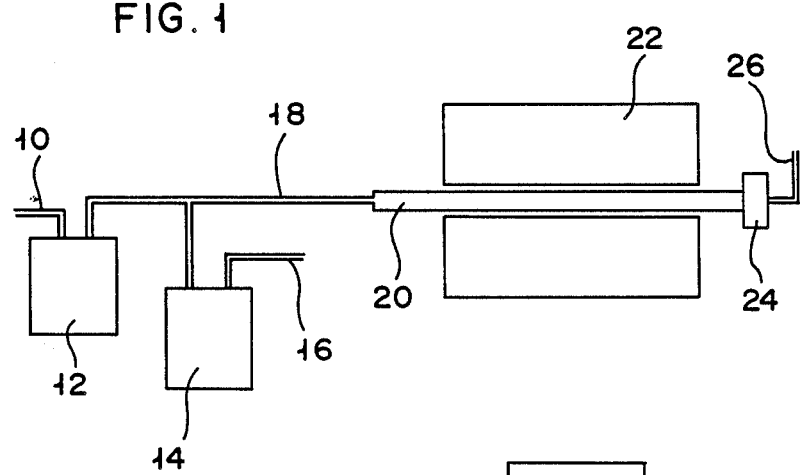
FIG. 1 is a schematic flow diagram of one embodiment of apparatus used in the process according to the invention.

The term "carbon compound" as used herein is intended to include all vaporizable inorganic compounds, such as CO gas, $CS_2$ gas and others, and all organic carbon compounds. As more useful compounds there may be mentioned aliphatic and aromatic hydrocarbons, as well as their derivatives containing other element(s), such as nitrogen, oxygen, sulfur, fluorine, bromine, iodine, phosphorus and arsenic. As non-limiting examples of the carbon compounds there may be mentioned alkanes (such as methane, ethane), alkenes (such as ethylene, butadiene), alkines (such as acetylene), aryl compounds (such as benzene, toluene, styrene), aromatic hydrocarbons containing fused ring(s) (such as indene, naphthalene, phenanthrene), cycloparaffins (such as cyclo-propane, cyclohexand), cyclo-olefins (such as cyclopentene, cyclohexene), alicyclic hydrocarbons containing fused ring(s) (such as steroids), sulfur-containing aliphatic compounds (such as methylthiol, methyl-ethyl sulfide, dimethyl thioketone), sulfur-containing aromatic compounds (such as phenylthiol, diphenylsulfide), sulfur-containing heterocyclic compounds (benzothiophene, thiophene), as well as petroleum including gasoline, kerosene, trupentine oil, camphor oil, pine oil, heavy oils, gear oil, cylinder oil and others. Of course, mixtures of these materials may be also used.

The term "inorganic transition metal compound" as used herein is intended to include all types of inorganic compounds of transition metal, which are vaporizable per se or soluble in at least one organic solvent. As the transition metal there may be mentioned iron, nickel, cobalt, molybdenum, vanadium and palladium with iron being preferred. The vaporizable inorganic compound of transition metal may include $FeCl_3$, $Fe(NO)_3Cl$, $Fe(NO)_2Br$, $Fe(NO)_2I$, $FeF_3$ and others, while the soluble inorganic compound of transition metal may include $Fe(NO_3)_2$, $FeBr_3$, $Fe(HCOO)_3$, $C_{27}H_{42}FeN_9O_{12}$, $Fe(SO_4)_3$, $Fe(SCN)_3$, $Fe(NO)_3NH_3$, $CO(NO)_2Cl$, $Ni(NO)Cl$, $Pd(NO)_2Cl_2$, $NiCl_2$ and others.

The term "carrier gas" as used herein is intended to include all types of gases which are inserted or not involved directly in the reaction, such as $CO_2$, $H_2$, $N_2$, $NH_3$, Ar, He, Kr and mixtures thereof.

The mixed gas as used in accordance with the invention may be prepared in the following two efficient ways, but not limited thereto. The first way is to separately prepare a mixed gas of a carrier gas with a carbon compound gas on one hand and another mixed gas of the carrier gas with an inorganic transition metal compound gas on the other hand and subsequently to mix both resulting mixed gases. The second way is to dissolve the inorganic transition metal compound in an organic solvent to form a solution which is then vaporized to form the mixed gas having the same composition in atomic level as the solution. These two methods will be described hereinbelow in more detail.

(1) First Method:

The inorganic transition metal compound which may be used in the first method is selected from such compounds that are vaporizable per se with the compounds having a vapor pressure more than 0.1 mmHg at 250° C. being preferred. The first method comprises the steps of forming a mixed gas of a carrier gas with an inorganic transition metal compound gas while passing the carrier gas under control of a temperature of a storing tank for the transition metal compound (but the passage of the carrier gas may be omittted if desired); forming another mixed gas of the carrier gas with a carbon compound gas while passing the carrier gas under control of a temperature of a storing tank for the carbon compound (but the passage of the carrier gas may be omitted if desired and the storing tank may be omitted if the carbon compound is gaseous); and mixing both resulting mixed gas thereby to prepare the final mixed gas as used in the invention consisting of the inorganic transition metal compound gas, the carbon compound gas and the carrier gas. The final mixed gas thus prepared may be reacted at a high temperature in a heated zone of 600 to 1300° C. thereby to continuously produce the carbon fibers with much higher productivity than in the basic substrate method of the prior art. If desired, this method may be partially modified to produce the same carbon fibers as in the prior method. In such modification, the substrate is placed in the heated zone into which is fed the mixed gas previously formed in the first step, thereby to decompose the inorganic transition metal compound and thus to permit a metal atom released from the decomposed compound to deposit on the substrate as fine articles. Thereafter, the mixed gas of the first step is discontinued for its feeding, while the mixed gas of the second step is started to be fed. Such modified method is more advantageous due to unnecessity of reducing the metal and due to low agglomeration of the fine partricles on the substrate than the prior method of seeding ultra-fine particles on the substrate.

(2) Second Method:

This method comprises the steps of dissolving the inorganic transition metal compound in an organic solvent which is then vaporized in the heated zone (if desired, any place other than the heated zone may be used) to prepare a gas or fume having the same composition in the atomic level as the solution of the transition metal compound in the solvent; and simultaneously or subsequently reacting the gas or fume at a high temperature ranging from 600° C. to 1300° C.

The first and second methods as described hereinabove are not different from each other in the resulting carbon fibers and are suitable for producing fine carbon fibers, especially those having very uniform aspect ratio of diameter 0.05 to 2 μm and length of 3 to 2000 μm. Such carbon fibers are very useful in producing composite materials. Namely, the uniform aspect ratio of the carbon fibers allows a stress from a resin, metal or ceramic matrix to be sufficiently transmitted and ensures low distortion of the fiber ends due to small sizes of the carbon fibers.

The invention will be described hereinbelow with reference to Examples.

EXAMPLE 1

FIG. 1 shows an experimental apparatus as used in Example 1, which comprises an alumina reactor tube 20 (inner diameter of 52 mm, outer diameter of 60 mm and length of 1700 mm) and an electric furnace 22 of a three-circuit type provided with a longitudinal heater which covers the reactor tube 20 over its 1000 mm length and is divided in three portions of equal distance. These three portions are independently controllable in temperature, with which an inner tempeature of the reactor tube 20 is maintained at 1100° C. Further, a thermally controllable tank 12 having stored transition metal compound gas is provided, into which is introduced $H_2$ gas through a feeding line 10 for a carrier gas to prepare a mixed gas of the $H_2$ gas with transition metal compound gas (first step). On the other hand, a thermally controllable tank 14 having stored $C_6H_{12}$ is provided, into which is introduced the $H_2$ gas through a feeding line 16 to prepare another mixed gas of the $H_2$ gas with the $C_6H_{12}$ gas (second step). Both mixed gases thus prepared in the first and second steps are mixed in a feeding line 18, through which the resulting mixed gas of the transition metal compound gas, the $C_6H_{12}$ gas and the $H_2$ gas is introduced into the reactor tube 20. In this case, the feeding line 18 for the mixed gas is heated by a heater in order to prevent condensation of the component gases within the feeding line 18. The mixed gas consisted of transition metal compound, $C_6H_{12}$ and $H_2$ in the volume ratio of 1.5 : 6.2 : 92.3 and is fed at a flow rate of 300 ml $H_2$gas/min. at 25° C., 1 atm. The reaction is continued for one hour to collect the resulting carbon fibers on a filter 24. A waste gas is discharged through an exhaust tube 26.

EXAMPLE 2

Figure 2:
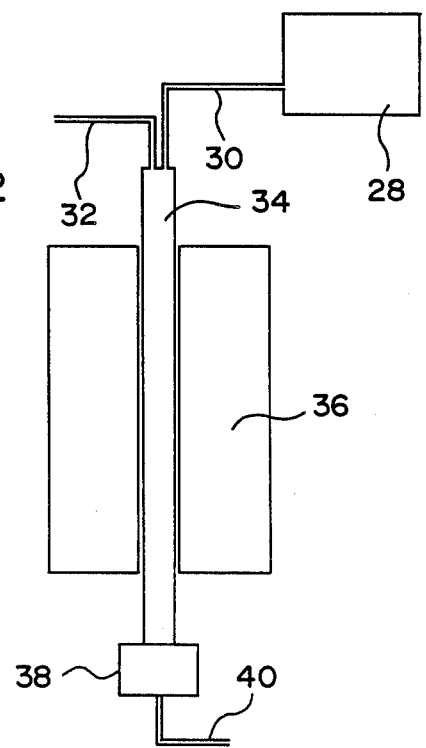
FIG. 2 is a schematic flow diagram of another embodiment of apparatus used in the process according to the invention.

FIG. 2 shows an experimental apparatus as used in Example 2, which comprises an alumina reactor tube 34 (inner diameter of 52 mm, outer diamteer of 60 mm and length of 1700 mm) and an electric furnace 36 of a three-curcuit type provided with a longitudinal heater which covers the reactor tube 34 over its 1000 mm length and is divided in three portions of equal distance. These three portions are independently controllable in temperature, with which an inner temperature of the reactor tube 34 was maintained at 1080° C. A 1 mole/1 solution of $Fe(NO_3)_2$ in $C_2H_5OH$ was provided in a storing tank 28 equipped with a pump of low flow rate (infusion pump IP - 21 of NIKKISO CO., LTD.), through which the solution is fed continuously at a rate of 0.2 g/min. To the alumina reactor tube, while an Ar gas was fed at a rate of 500 ml/min. (25° C., 1 atm.) thereto through a feeding line 32 for the carrier gas. The reaction was continued for one hour to collect the resulting carbon fibers on a filter 38. A reference 40 represents an exhaust tube. The carbon fibers collected on the filter 38 and within the reactor tube 34 were evaluated to find the size of 0.2 μ×31 μ (diameter×length) and the yield of 1.3 g.

EXAMPLE 3

Using the same apparatus as in Example 1, FeCl$_3$ was charged in the storing tank 12 into which was introduced N$_2$ gas through the carrier gas feeding line 10 to prepare a mixed gas of the N$_2$ gas and FeCl$_3$ (first step). On the other hand, toluene was charged in the thermally controllable storing tank 14 into which was introduced H$_2$ gas through the carrier gas feeding line 16 to prepare another mixed gas of the toluene gas and the H$_2$ gas (second step). Both mixed gases thus prepared in the first and second steps were passed through the feeding line 18 to form a mixed gas of the FeCl$_3$ gas, the toluence gas, the N$_2$ gas and the H$_2$ gas, which mixed gas was introduced into the reactor tube 20. In this case, the feeding line 18 was heated by the heater in order to prevent condensation of the component gases within the feeding line 18. The final mixed gas consisted of FeCl$_3$, C$_6$H$_5$CH$_3$, and N$_2$ and H$_2$ in the volume ratio of 0.2 : 5.5 : 10 : 84.3, respectively, while a flow rate of the H$_2$ gas was 500 m./min. at 25° C. under 1 atm. The reaction was continued for one hour to collect the resulting carbon fibers deposited on the filter 24 and within the reactor tube 20, which fibers were evaluated to find the size of 0.2 μ×20 μ (diameter×length) and the yield of 0.8 g.

EXAMPEL 4

Using the same apparatus as in Example 1, Fe(NO)$_3$Cl was charged in the storing tank 12 into which was introduced H$_2$ gas through the carrier gas feeding line 10 to prepare a mixed gas of the H$_2$ gas and Fe(NO)$_3$Cl (first step). On the other hand, C$_6$H$_6$ was charged in the thermally controllable storing tank 14 into which was introduced H$_2$ gas through the carrier gas feeding line 16 to prepare another mixed gas of the C$_6$H$_6$ gas and the H$_2$ gas (second step). Both mixed gases thus prepared in the first and second steps were passed through the feeding line 18 to form a mixed gas of the Fe(NO)$_3$Cl gas, the C$_6$H$_6$ gas and the H$_2$ gas, which mixed gas was introduced into the reactor tube 20. In this case, the feeding line 18 was heated by the heater in order to prevent condensation of the component gases within the feeding line 18. The final mixed gas consisted of Fe(NO)$_3$Cl, C$_6$H$_6$ and H$_2$ in the volume ratio of 2.0:8.5: 89.5, while a flow rate of the H$_2$ gas was 400 ml/min. at 25° C. under 1 atm. The reaction was continued for one hour to collect the resulting carbon fibers of the gas phase growth deposited on the filter 24 and within the reactor tube 20, which fibers were evalutated to find the size of 0.3 μ×37 μ (diameter×length) and the yield of 1.8 g.

In accordance with the invention, the process may be stabilized and the productivity may be improved.

Although the invention has been described hereinabove with the preferred embodiments, it will be appreciated to a person skilled in the art that many variations and modifications may be possible without departing from the spirit and the scope of the invention.

What is claimed is:

1. In a process for preparing carbon fibers in a gaseous phase reaction, the improvement comprising introducing a gas mixture comprising at least one carbon compound, at least one inorganic transition metal compound gas and at least one carrier gas into a reactor and subjecting said mixture to a temperature of 600° C. to 1300° C. in said reactor for inducing growth of carbon fibers without using any substrate.

2. A process according to claim 1, wherein the inorganic transition metal compound is an inorganic iron compound.

* * * * *